United States Patent
Albrecht et al.

(10) Patent No.: US 10,445,877 B2
(45) Date of Patent: Oct. 15, 2019

(54) METHOD AND SYSTEM FOR CROP RECOGNITION AND BOUNDARY DELINEATION

(71) Applicant: INTERNATIONAL BUSINESS MACHINES CORPORATION, Armonk, NY (US)

(72) Inventors: Conrad M. Albrecht, White Plains, NY (US); Hendrik F. Hamann, Yorktown Heights, NY (US); Levente Klein, Tuckahoe, NY (US); Siyuan Lu, Yorktown Heights, NY (US); Fernando J. Marianno, New York, NY (US)

(73) Assignee: International Business Machines Corporation, Armonk, NY (US)

(*) Notice: Subject to any disclaimer, the term of this patent is extended or adjusted under 35 U.S.C. 154(b) by 99 days.

(21) Appl. No.: 15/395,748

(22) Filed: Dec. 30, 2016

(65) Prior Publication Data

US 2018/0189954 A1 Jul. 5, 2018

(51) Int. Cl.
  *G06T 7/00* (2017.01)
  *G06K 9/00* (2006.01)
  *G06T 7/12* (2017.01)
  *G06T 7/136* (2017.01)

(52) U.S. Cl.
  CPC ........ *G06T 7/0012* (2013.01); *G06K 9/00476* (2013.01); *G06K 9/00657* (2013.01); *G06T 7/12* (2017.01); *G06T 7/136* (2017.01); *G06T 2207/10032* (2013.01); *G06T 2207/30188* (2013.01)

(58) Field of Classification Search
  CPC .................................................. G06K 9/4604
  See application file for complete search history.

(56) References Cited

U.S. PATENT DOCUMENTS

| 7,916,898 B2 | 3/2011 | Anderson |
| 9,202,252 B1 | 1/2015 | Smith et al. |
| 9,058,633 B2 | 6/2015 | Lindores et al. |
| 9,131,644 B2 | 9/2015 | Osborne |
| 9,875,430 B1 * | 1/2018 | Keisler ............... G06K 9/6276 |

(Continued)

OTHER PUBLICATIONS

Alemu, "Automated Farm Field Delineation and Crop Row Detection from Satellite Images", STARS Project.org MSc Theses. Feb. 2016. Available at http://www.stars-project.org/en/knowledgeportal/msc-theses/melkamu-meseret-alemu/. pp. 1-73.

(Continued)

*Primary Examiner* — Qian Yang
(74) *Attorney, Agent, or Firm* — Tutunjian & Bitetto, P.C.; Vazken Alexanian (57) ABSTRACT

A computer-implemented method for determining farm boundary delineations within a target geographic area, comprising extracting data from pixels of a satellite image of the target geographic area, evaluating the data using a classification algorithm to generate one or more line segments between adjacent pixels, the one or more line segments being representative of a portion of a boundary delineation, connecting the one or more line segments to an adjacent line segment to form a boundary delineation defining at least one parcel of land within the target geographic area, and generating a boundary delineation map including the boundary delineation.

20 Claims, 7 Drawing Sheets

(56) References Cited

U.S. PATENT DOCUMENTS

| | | | |
|---|---|---|---|
| 2011/0320229 | A1 | 12/2011 | Stehling et al. |
| 2013/0024411 | A1 | 1/2013 | Cai et al. |
| 2015/0022656 | A1 | 1/2015 | Carr et al. |
| 2015/0193630 | A1 | 7/2015 | Von Kaenel et al. |
| 2016/0086034 | A1* | 3/2016 | Kennedy ............... G06K 9/342 382/200 |
| 2016/0157414 | A1 | 6/2016 | Ackerman et al. |
| 2016/0179841 | A1* | 6/2016 | Ford ................ G06F 17/30241 701/532 |
| 2016/0224703 | A1 | 8/2016 | Shriver |
| 2016/0307073 | A1* | 10/2016 | Moody .............. G06K 9/00536 |
| 2016/0334276 | A1 | 11/2016 | Pluvinage |
| 2017/0161627 | A1 | 6/2017 | Xu et al. |
| 2017/0278248 | A1* | 9/2017 | Overbye ................... G06T 7/12 |
| 2018/0132422 | A1* | 5/2018 | Hassanzadeh ......... A01G 22/00 |
| 2018/0293671 | A1 | 10/2018 | Murr et al. |

OTHER PUBLICATIONS

Fais et al., "Airborne hyperspectral scanner and laser altimeter data application to water reservoirs and water use calculation: first results on two Italian case study", Proceedings of SPIE 5976—Repote Sensing for Agriculture Ecosystems, and Hydrology VII 59760. (Oct. 18, 2005); Available at http://dx.doi.org/10.1117/12.627787. pp. 1-12.

NASA, "Potential benefits to be derived from applications of remote sensing of agricultural, forest, and range resources" NASA Technical Reports Server (NTRS) Dec. 1, 1967. Available at https://ntrs.nasa.gov/search.jsp?R=19690025552. pp. 1-170.

Meron et al., "Crop water stress mapping for site-specific irrigation by thermal imagery and artificial reference surfaces", Precision Agriculture. vol. 11, Issue 2. Apr. 2010. pp. 1-26.

Monmonier, "Aerial Photography at the Agricultural Adjustment Administration: Acreage Controls, Conservation Benefits, and Overhead Surveillance in the 1930s", Photogrammetric Engineering and Remote Sensing, vol. 68, No. 11. Dec. 2002, pp. 1257-1261.

Olfert et al., "Aerial photography for detection and assessment of grasshopper (Orthoptera: Acrididae) damage to small grain crops in Saskatchewan" The Canadian Entomologist. vol. 112, Issue 6. Jun. 1980. pp. 559-566. (Abstract only.).

Sahoo, "Use of Remote Sensing for Generation of Agricultural Statistics", Indian Agricultural Statistics Research Institute, New Delhi-10012. Feb. 2013. pp. 1-9.

Schurch et al., "Determining the foraging Potential of Oilseed Rape to Honey Bees Using Aerial Surveys and Simulations", Journal of Apicultural Research. Jul. 14, 2015. vol. 54, No. 3. Available at http://dx.doi.org/10.1080/00218839.2015.1108144. pp. 1-8.

Allen et al., "Economic Forecasting in Agriculture", International Journal of Forecasting. vol. 10(1). Feb. 1, 1994. pp. 81-135.

Badhwar, GB., "Automatic Corn—Soybean Classification Using Landsat MSS Data. II. Early Season Crop Portion Estimation", Remote Sensing of Environment. vol. 14. Jan. 1, 1984. pp. 31-37.

Doraiswamy, et al., "Crop Classification in the U.S. Corn Belt Using MODIS Imagery", Geoscience and Remote Sensing Symposium, 2007. Jul. 23-28, 2007. pp. 809-812.

Feng, et al., "Weather Anomalies, Crop Yields, and Migration in the US Corn Belt", Available at http://www.columbia.edu/~ws2162/articles. Mar. 2015. pp. 1-64.

Anonymous, "Optimizing Crop Profit Across Multiple Grain Attributes and Stover", IP.com Prior Art Database Technical Disclosure. May 26, 2009. IP.com No. IPCOM000183536D. pp. 1-17.

Anonymous, "Sustainable Prediction Model for Farming", IP.com Prior Art Database Technical Disclosure. Oct. 31, 2013. IP.com No. IPCOM000232313D. pp. 1-11.

Anonymous, "System and Method for AgriPlanet—A Collaborative Portal Bringing Together Farmers, Agri Stakeholders and Philanthropist", IP.com Prior Art Database Technical Disclosure. Oct. 16, 2015. IP.com No. IPCOM000243783D. pp. 1-6.

Jakubauskas, et al., "Crop Identification Using Harmonic Analysis of Time-Series AVHRR NDVI Data", Computers and Electronics in Agriculture. vol. 37, Issues 1-3. Dec. 2002. pp. 127-139.

Pena-Barragan et al., "Object-Based Crop Identification Using Multiple Vegetation Indices, Textural Features and Crop Phenology", Remote Sensing of Environment. vol. 115, Issue 6. Jun. 15, 2011. Available at http://www.sciencedirect.com/science/article/pii/S0034425711000290. pp. 1301-1316.

Reed et al., "Measuring Phenological Variability from Satellite Imagery", Journal of Vegetation Science. vol. 5, No. 5. Nov. 1994. Available at http://www.jstor.org/stable/i362436. pp. 703-714.

Sakamoto et al., "A Crop Phenology Detection Method Using Time-Series MODIS Data", Remote Sensing of Environment. vol. 96, Issues 3-4. Jun. 2005. Available at http://www.sciencedirect.com/science/article/pii/S0034425711000290 pp. 366-374.

Schmedtmann et al., "Reliable Crop Identification with Satellite Imagery in the Context of Common Agriculture Policy Subsidy Control", Remote Sensing. vol. 7, Issue 7. Jul. 22, 2015. Available at http://www.mdpi.com/2072-4292/7/7/9325 pp. 9325-9346.

Singh, "Digital Change Detection Techniques Using Remotely-Sensed Data", International Journal of Remote Sensing. vol. 10, Issue 6. Feb. 1988. pp. 989-1003.

U.S. Office Action issued in U.S. Appl. No. 15/395,613 dated Mar. 28, 2019, 35 pages.

* cited by examiner

METHOD AND SYSTEM FOR CROP RECOGNITION AND BOUNDARY DELINEATION

BACKGROUND

Technical Field

The present invention generally relates to crop recognition and farm boundary delineation, and more particularly to analyzing satellite data and historical planting patterns to determine boundary delineations.

Description of the Related Art

Farmers use a variety of methods to determine what crops to grow for a given amount of land, especially as various factors effect crop selection. For example, environmental factors (e.g., climate characteristics, soil characteristics, weather, etc.) constrain crop selection, as certain crops must be planted at certain times of the year and/or during specific climate conditions. In some instances, only certain types of crops and/or rotation patterns are feasible for a particular plot of land to increase economic benefits. In addition, market conditions (e.g., market demands, resource availability, market prices, etc.) often influence crop selection and acreage allocation (e.g., the amount of land devoted to a specific crop).

However, information related to farm boundaries is not readily available due to privacy and ownership concerns, making it difficult to assess acreage allocation that may be planted with a single crop. Some systems can identify acreage that includes vegetation, however, such systems merely identify the general presence of vegetation and cannot identify particular crops that are planted within such acreage to delineate boundary lines between vegetated areas.

SUMMARY

In accordance with an embodiment of the present invention, a computer-implemented method for determining farm boundary delineations within a target geographic area is provided. The method includes extracting data from pixels of at least one satellite image of the target geographic area, evaluating the data using a classification algorithm to generate one or more line segments between adjacent pixels, the one or more line segments being representative of a portion of a boundary delineation, connecting the one or more line segments to an adjacent line segment to form a boundary delineation defining at least one parcel of land within the target geographic area, and generating a boundary delineation map including the boundary delineation.

In accordance with an embodiment of the present invention, a system for determining farm boundary delineations within a target geographic area is provided. The system includes one or more processors including memory, and one or more inputs through which data for the target geographic area is received by the system, wherein the data is extracted from pixels of at least one satellite image of the target geographic area, an analyzer to evaluate the data using a classification algorithm to generate one or more line segments between adjacent pixels, the one or more line segments being representative of a portion of a boundary delineation, and a boundary identifier to connect the one or more line segments to an adjacent line segment to form a boundary delineation defining at least one parcel of land within the target geographic area, and generate a boundary delineation map including the boundary delineation.

In accordance with an embodiment of the present invention, a computer program product for determining farm boundary delineations within a target geographic area is provided. The computer program product includes a non-transitory computer readable storage medium having program instructions embodied therewith, the program instructions being executable by a computer to cause the computer to perform a method determining boundary delineations, the method comprising extracting data from pixels of at least one satellite image of the target geographic area, evaluating the data using a classification algorithm to generate one or more line segments between adjacent pixels, the one or more line segments being representative of a portion of a boundary delineation, connecting the one or more line segments to an adjacent line segment to form a boundary delineation defining at least one parcel of land within the target geographic area, and generating a boundary delineation map including the boundary delineation.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention provides systems and methods to identify crop types and/or determine boundary delineations by extracting and/or evaluating satellite data and historical planting patterns. In some embodiments, the present invention can be used for identifying and evaluating, for example, crop selection, crop rotation, resource allocation, etc. In an embodiment, the systems and methods described herein allow data input by a user and/or historical planting patterns related to multiple parcels of land to provide a comprehensive farm management plan. In some embodiments, the present invention can be used for identifying boundary delineations using satellite data, such as normalized difference vegetation index (NDVI) values, which distinguishes land areas that include vegetation from non-vegetated areas in addition to identifying varying crop types within vegetated regions.

Exemplary applications/uses to which the present invention can be applied include, but are not limited to: determining expected production based on yield and/or planted acreage, estimating geographic crop supply to reduce demand/supply imbalance, updating land ownership databases based on boundary delineations, and minimizing insurance fraud. In some embodiments, the present invention may be used to generate farm management plans. Farm management plans are crucial in the development of farmland. For example, farm management plans help to support production management, such as meeting increased demands for a product while reducing production costs. In addition, farm management plans assist in maintaining quality of agricultural products and compliance with agricultural standards. Determining boundary delineations is important in farm management plans, especially as land boundaries may not be publically available due to privacy concerns, making estimated yields of agricultural products difficult to determine.

Figure 1:
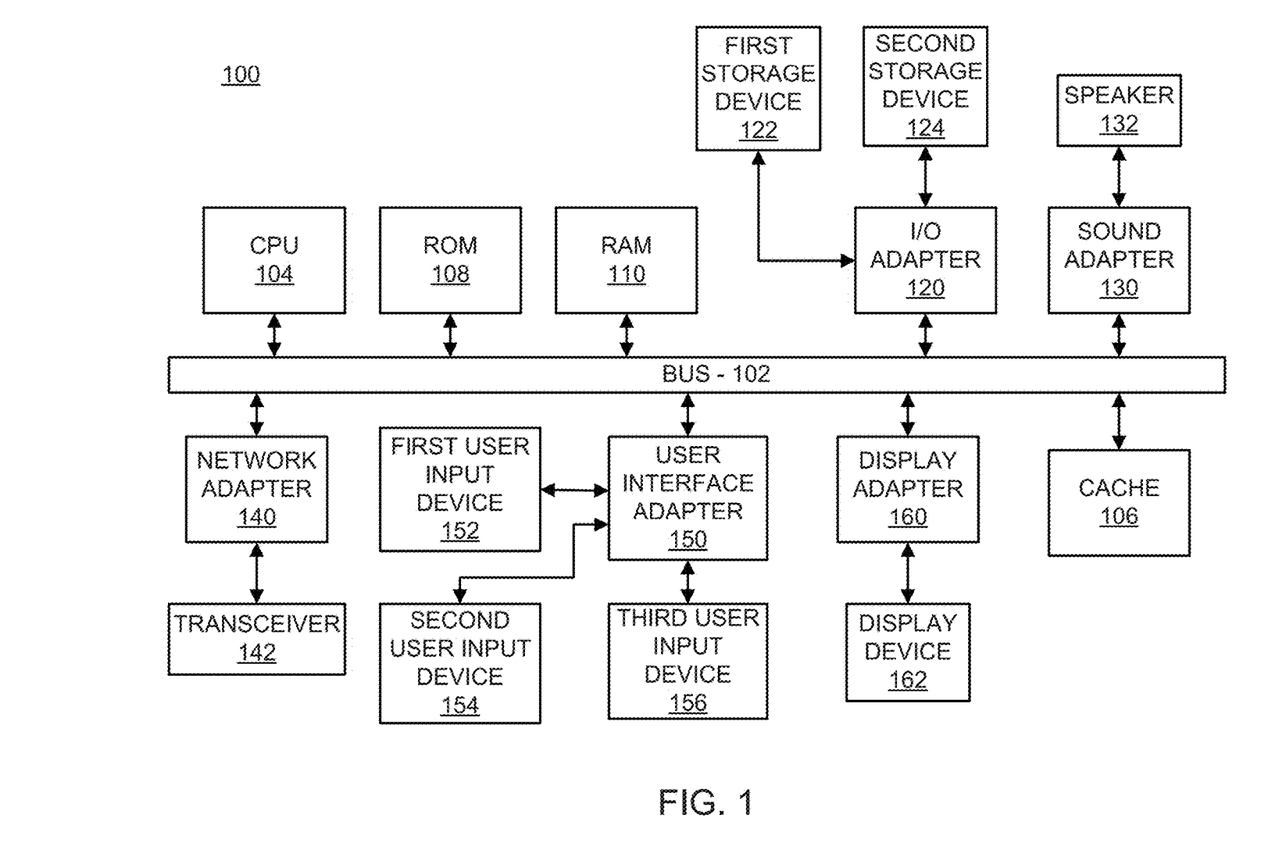
FIG. 1 shows an exemplary embodiment of a processing system to which the present invention may be applied.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

The processing system 100 can also include other elements (not shown), as well as omit certain elements. For example, various other input devices and/or output devices can be included in processing system 100, depending upon the particular implementation of the same. For example, various types of wireless and/or wired input and/or output devices can be used. Moreover, additional processors, controllers, memories, and so forth, in various configurations can also be utilized. It is to be appreciated that the terms processors and controllers can be used interchangeably herein.

Figure 2:
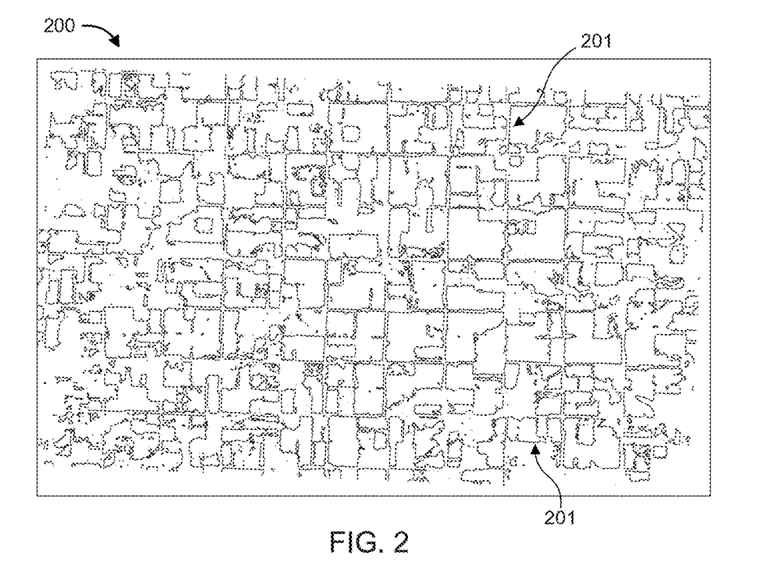
FIG. 2 is a boundary delineation map, in accordance with an embodiment of the with present invention.

FIG. 2 represents a boundary delineation map 200 generated from data (e.g., remote sensing measurements) in one or more aerial images, such as satellite images, and/or historical planting patterns in accordance with embodiments of the present invention. In some embodiments, satellite images can be obtained from a cadastral survey and/or a Lidar system, which measures distance to a target (e.g., the land) by illuminating the target with a laser light. Cadastral surveys are documents and/or maps which include boundaries of land ownership. In some embodiments, the boundary delineation map 200 can be generated from a plurality of satellite images of a specific geographic area over a predetermined timespan.

The boundary delineation map 200 shows boundary delineations 201 (e.g., solid black lines) separating a plot of land from other plots of land, which appear as polygons of various shapes and sizes. A polygon is a shape that is bounded by a finite chain of straight line segments closing in a loop to form a closed shape. For example, the polygons can include shapes that appear to approximately resemble a rectangle, square, triangle, etc. In some embodiments, farm boundaries can be delineated by detecting and evaluating the satellite data using a thresholding algorithm. The thresholding algorithm can replace a pixel within the satellite image with a black pixel if the image intensity is less than some fixed predetermined value (e.g., a constant), or a white pixel if the image intensity is greater than the predetermined value. In areas where a similar value for pixels exist, a segmentation and/or clustering algorithm can be applied to place all pixel values in the same category and, thus, larger areas sharing the same characteristics can be defined to provide a boundary delineation 201. For example, any pixel within the satellite image that is greater than the predetermined value is represented by a black pixel (e.g., vegetation), whereas any pixel that is greater than the predetermined value is represented by a white pixel (e.g., water, road, etc.). The black pixels are employed to form one or more line segments, the line segments representative of a portion of the boundary delineation 201. The line segments can be used to form one or more polygons (e.g., open and/or closed), each side of the polygon being representative of a boundary delineation 201.

In an embodiment, any open polygons (e.g., shapes that are not completely closed) within the boundary delineation map 200 are closed such that the boundary delineation map 200 includes multiple plots of land (e.g., parcels). Farms may be identified as substantially rectangular parcels or a subset of well-defined features that, when combined, form a substantially rectangular parcel. In some embodiments, boundary lines between rectangular parcels can include road networks; houses may be represented by smaller polygons within the rectangular parcel such that houses further identify farm boundaries. Accordingly, boundary delineations 201 can be extracted from satellite imagery and such information can be used to update land maps/surveys.

Figure 3:
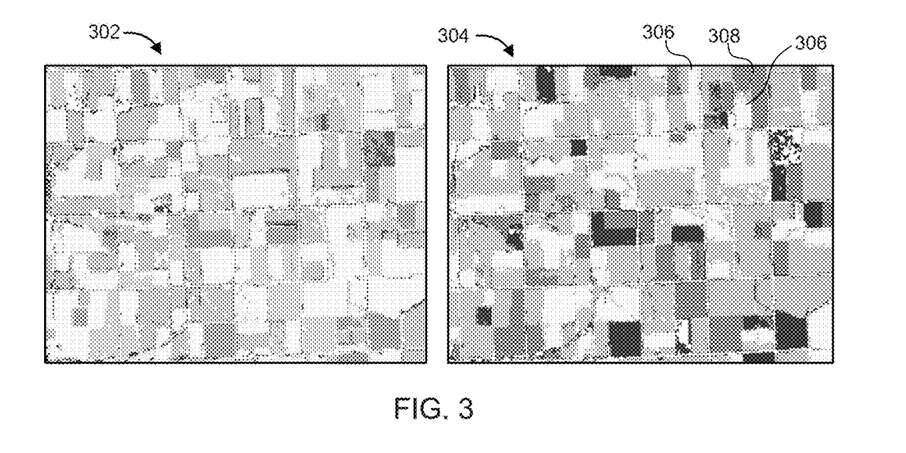
FIG. 3 depicts satellite images having data that can be used in making determinations for different parcels of land, in accordance with an embodiment of the with present invention.

Now referring to FIG. 3, satellite images 302 and 304 are illustratively depicted. The images 302 and 304 comprise a plurality of pixels. Each pixel of the image 302, 304 stores satellite data for the geographic area represented by the pixel, and stores the location of the geographic area corresponding to the pixel. The stored satellite data can include remote sensing measurements (e.g., a normalized difference vegetation index) detected from the geographic area in each of the pixels. By extracting this information from the satellite data, determinations can be made, e.g., determinations such as the presence of vegetation, types of vegetation (e.g., crop types), similarity of crop types between parcels, boundary delineations, etc., as described in further detail below.

In an embodiment, remote sensing measurements include a normalized difference vegetation index (NDVI) which can be employed to identify and/or validate boundary delineations. The NDVI is a numerical indicator to assess whether the target (e.g., one or more areas of land) includes live green vegetation. The NDVI can be measured using, for example, satellite remote sensors (e.g., an Advanced Very High Resolution Radiometer (AVHRR)). In some embodiments, the NDVI value can differentiate parcels and identify/validate boundary delineations. For example, the NDVI can differentiate between parcels having vegetation versus parcels that do not include vegetation, such as roadways, desserts, waterways (e.g., rivers, wetlands), etc. In some embodiments, the NDVI can further delineate farms based on uniformity of signals (e.g., spectral information) between the plurality of parcels. In an embodiment, distinct changes in the NDVI value, thermal band, or near-infrared values between two parcels can be indicative of a boundary delineation. For example, NDVI values corresponding to a region 306 can be significantly different than NDVI values corresponding to a region 308. Such difference in NDVI values between regions 306 and 308 can, therefore, be indicative of a boundary delineation between such regions.

Vegetation (e.g., plants) absorbs solar radiation in the spectral region and reflects solar radiation in the near-infrared spectral region, which can be measured/detected using spectral reflectance measurements. Accordingly, vegetated regions and non-vegetated regions reflect different signal strengths of spectral reflectance measurements which can be employed to identify parcels planted with the same or similar crop type and/or boundary delineations. Similarly, vegetated regions having different crop types can be differentiated based on the signal strengths of their respective spectral reflectance measurements. The spectral reflectance measurements include ratios of the reflected radiation over the incoming radiation in each spectral band individually, which can be represented by values between 0 and 1.0. For example, vegetation can appear relatively bright in the near-infrared. If there is much more reflected radiation in near-infrared wavelengths than in visible wavelengths, then the vegetation in that pixel is likely to be dense and may contain some type of vegetation. In contrast, non-vegetated areas tend to appear dark in the near-infrared.

The image data in images 302, 304 show regions of having different shading representative of, for example, the strength of the respective NDVI value, according to one embodiment. Specifically, the different shadings represent unique NDVI values (e.g., 0 to 1.0). In an embodiment, the NDVI values in images 302, 304 can be employed to illustrate/extract distinct changes in the types of crops (e.g., vegetation) planted on each parcel. For example, the lightly-shaded regions 306 represent areas with little to no vegetation, which may be indicative of dirt parcels, roadways, driveways, waterways, etc. The darker shaded regions 308 represent parcels having vegetation corresponding to a unique NDVI value, such as corn. All pixels in images 302, 304 having similar characteristics (e.g., similar and/or same NDVI values) is indicative of the same/similar crop types, and can be extracted to determine a total area having a specific planted crop type. For example, all pixels within region 308 can have the same/similar NDVI values; thus, region 308 includes the same crop type (e.g., corn). Accordingly, multiple parcels having similarly shaded regions (e.g., darker regions 308) can be indicative of the same and/or similar crop type being present on such parcels. This is because signal strengths of the NDVI and/or spectral information within images 302, 304 for each of the parcels is similar.

In some embodiments, management practices of a particular parcel of land can be monitored and/or extracted from images 302, 304 to further define historical planting patterns and/or boundary delineations. For example, the NDVI can be measured/extracted from each parcel within the image 302, 304 at predetermined intervals over a period of time (e.g., every month for a period of ten years) to generate a historical planting pattern particular to each parcel (e.g., geographic area). For example, image 302 can be a satellite image from a first date (e.g., May $1^{st}$) and image 304 can be a corresponding satellite image from a second date (e.g., July $1^{st}$) during the period of time. The extracted data can be stored in, for example, memory. The NDVI can vary throughout the growing season(s), especially as each parcel is subjected to different crop types planted at different times of the year (e.g., crop rotation), when tilling and/or irrigation practices are commenced, and when planting configurations (e.g., orientation of rows) change.

In some embodiments, adjacent parcels that exhibit similar management practices is indicative of parcels belonging to the same landowner. For example, adjacent parcels that are both irrigated, harvested, etc. at the same time is indicative of those parcels being commonly owned. In another example, adjacent parcels that are planted with the same crop type at the same time and/or for an extended amount of time, which can be identified by the NDVI value, is indicative of those parcels being commonly owned. In some embodiments, adjacent parcels that exhibit same direction of planting rows is indicative of similar management practices and/or common ownership. Management practices of each parcels can be determined by, for example, image comparison techniques. For example, if satellite data for region 306 shows horizontal planting rows and region 308 shows vertical planting rows, a determination that such regions are not commonly owned can be made by comparing the management practices of each parcel.

Thus, adjacent parcels exhibiting such distinctions can be identified as multiple parcels, and boundary delineations between the adjacent parcels and/or other parcels not exhibiting similar management practices can be detected. Accordingly, the present invention can reconstruct and/or update land ownership data (e.g., ownership maps, surveys, etc.) based on such satellite data and/or historical planting patterns, especially those parcels that do not have available land ownership information. It should be understood that while the present invention discusses embodiments which employ NDVI values, additional spectral indices, such as soil color, plants, water, stress, etc., can be employed or in combination to identify crop types and/or boundary delineations.

Correctly identifying boundary delineations can help determine, for example, estimated agricultural production (e.g., yield) based on planted acreage, and such information can be employed to update land ownership information which can minimize insurance fraud. As an example, assume that only half of an area of a farm was planted with crops, as detected by satellite and/or NDVI values. Such information can be compared with an insurance claim, which may state that the whole area was planted and destroyed, by analyzing images/information prior to the insurance claim which demonstrates that half of the farm was not planted at all. In another example, assume the insurance claim states that the loss was very high. Satellite imagery information can be used to indicate that the damage was localized to a small area of the land while other parts remained undisturbed. Thus, the insurance claim can be readjusted to reflect the reality on the ground.

Figure 4:
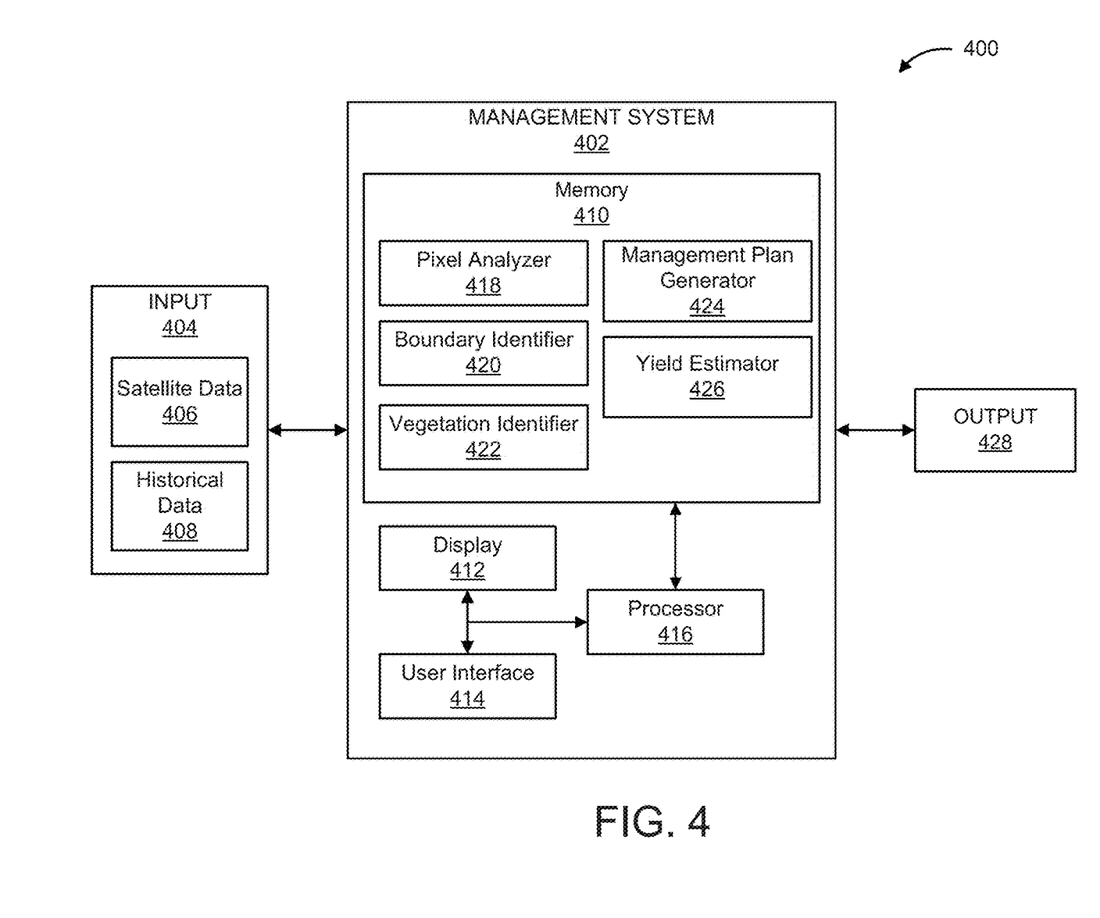
FIG. 4 depicts an exemplary system/method for determining boundary delineations in accordance with an embodiment of the present invention.

Referring now to FIG. 4, a system 400 in accordance with an embodiment of the present invention is shown with respect to an operational environment in which the present invention can be utilized. System 400 includes a management system 402 that includes one or more processors 416 and memory 410 for storing applications, modules and other data. In one embodiment, the memory unit 410 includes a large number of memory blocks e.g., where calculations and data analysis may be performed. The system 400 can also include one or more displays 412 for viewing content. The display 412 permits a user to interact with the system and its components and functions. This may be facilitated by the inclusion of a user interface 414, which can include a mouse, joystick, or any other peripheral or control to permit user interaction with the system and/or its devices. It should be understood that the components and functions of the system may be represented as one or more discrete systems or workstations, or may be integrated as part of a larger system or workstation.

System 400 is depicted as a computer-implemented system for determining farm boundary delineations in accordance with an embodiment of the present invention, to, for example, manage land, e.g., farmland, in a manner that maximizes crop yields and provides land ownership information. By managing the conditions under which crop types are planted and monitoring satellite data to determine boundary delineations, those involved in farm management can maximize crop yields, thereby meeting and perhaps exceeding crop yield projections.

The system 400 receives input 404, which includes satellite data 406, e.g., aerial maps, satellite images, etc., of a target geographic area. The target geographic area can include a plurality of parcels/farms. Such maps and images can be generated from cadastral surveys provided by the Bureau of Land Management (BLM), which is created by the U.S. Department of the Interior. Additionally, the information from such imagery can be generated from work performed by government or non-government agencies, individuals, and others who perform Lidar imaging. In another embodiment, the satellite data 406 can be generated from additional sources, such as a direct survey of the land, remote sensing measurements, other kinds of aerial and satellite imagery, photogrammetry, radar and sonar. The satellite data 406 can include, for example, a plurality of satellite images of a target geographic region over a predetermined amount of time. As will be described in further detail below, the system 400 analyzes the satellite data 406 to determine boundary delineations defining parcels within the target geographic area.

In some embodiments, historical data 408 can be received as input 404 into the system 400. Historical data 408 includes historical planting patterns, including crop types and associated planting schedules (e.g., times of the year that such crops may be planted), crop rotation patterns (e.g., rotation of specific crop types, such as corn and soy), production costs (e.g., fertilizer, seeds, etc.), historical supply/demand information for particular crop types, availability of resources (e.g., seeds available on the market), etc. In addition, historical data 408 can include prior crop identifications and/or NDVI values for particular parcels of land over a previous period of time (e.g., ten years). In some embodiments, historical data 408 includes prior management practices of the target geographic area (e.g., tilling, irrigation, planting patterns, direction of planting rows, etc.) which can be used to determine boundary delineations defining parcels within the target geographic area.

In some embodiments, the management system 402 utilizes the satellite data 406 and/or historical data 408 to determine crop types that should be planted, taking in account historical production costs, historical prices for crop types, and/or historical demand for crop types. For example, every one pound of corn requires approximately one pound of fertilizer, while soybean does not require fertilizer. However, soybean production can replenish the soil with appropriate nutrients, such that the land can produce high quality corn in future plantings. Accordingly, crop rotation patterns alternating soybean and corn can be implemented to minimize production costs (e.g., reduce fertilizer purchases) while maintaining a high quality product. In some embodiments, the present invention can identify crop rotation patterns within a particular parcel, as defined by the boundary delineations, and estimate a probability that a particular crop may be planted. The crop rotation patterns and/or estimated probability can be used to generate one or more farm management plans, with crop rotation patterns, crop planting probability (e.g., a probability of a specific crop being planted), etc. being included in each farm management plan.

The management system 402 includes a pixel analyzer 418, boundary identifier 420, vegetation identifier 422, management plan generator 424, and yield estimator 426. The pixel analyzer 418 receives the input data 404, e.g., satellite image data 406, and identifies pixels associated with a plurality of plots of land to be analyzed. The boundary identifier 420 analyzes the image data (e.g., pixels) and extracts information from the satellite data 406 and/or historical data 408 to generate boundary delineations between each plot of land.

In some embodiments, the satellite data 406 includes pixel values for each pixel within each satellite image. For example, pixels can exhibit different values in resolution, such as brightness, contrast and/or color. In color images, separate colors (e.g., red, green and blue components) are specified for each pixel. For grayscale images, the pixel value can be a single number representative of the brightness of the pixel. As an example, a pixel value of zero can be black and a pixel value of 255 can be white, with values in between forming different shades of gray. The pixel analyzer 418 can detect pixel values for each pixel.

The boundary identifier 420 can compare adjacent pixels to determine whether or not a boundary delineation exits. Significant changes between two adjacent pixels (e.g., pixel values) can indicate a boundary delineation between two farms. Thus, if two adjacent pixels exhibit different pixel values, the boundary identifier 420 generates a boundary delineation (e.g., a line segment) at the interface between the adjacent pixels. Each line segment can connect to an adjacent line segment to form various shapes. If the boundary delineations (e.g., one or more line segments) form a rectangular shape or circular/oval shape, it is highly likely that that boundary is defined by machinery that works the land or property boundaries. These newly defined boundaries can be searched in the existing traces (e.g., historical data 408) for that particular area that can be indicative of property boundaries.

The boundary identifier 420 generates a boundary delineation map having a plurality of polygons (e.g., shapes) corresponding to parcels/lots and/or other features within the satellite image. Each plot of land can appear as a polygon which is bounded by a finite chain of straight line segments closing in a loop to form a closed shape. For example, the polygon includes shapes that appear to approximately resemble a rectangle, square, triangle, etc. Farm boundaries can be delineated by analyzing the shapes and/or polygons. In some embodiments, the boundary identifier 420 closes any open polygons (e.g., shapes that are not completely closed) by connecting line segments with adjacent line segments in the boundary delineation map. Farms can be identified as substantially rectangular parcels, or a subset of well-defined features that, when combined, form a substantially rectangular parcel. For example, if the satellite images indicate that there is no man made construction present on the land (e.g., houses, barns, etc.) within a defined parcel, the whole parcel can be identified as belonging to the same owner, and partial shapes generated in that area can be joined in a larger shape to indicate the completeness of reconstruction. If the shapes are in close proximity, such shapes can be joined. This is especially true if reconstructed farm boundaries have irregular shapes and are adjacent to each other within the boundary of a parcel that has a rectangular shape.

In some embodiments, the boundary identifier 420 identifies and/or validates boundary delineations using NDVI values. NDVI values can be stored in satellite data 406 and/or historical data 408, or can be detected by the vegetation identifier 422, as will be described in further detail below. NDVI values can be associated with each pixel value such that a satellite image includes a plurality of NDVI values. For example, a first pixel can include an NDVI value of 1 and a second pixel, which is adjacent to the first pixel, can include an NDVI value of 0. Thus, significant changes in the NDVI values between adjacent pixels can be employed to generate delineations between parcels of land.

The boundary identifier 420 can analyze the NDVI values and generate boundary delineations where NDVI values change/fluctuate. In an embodiment, the boundary identifier 420 can generate a boundary delineation (e.g., a line segment) at the interface between the adjacent pixels exhibiting different NDVI values. Each line segment can connect to an adjacent line segment to form various shapes.

For example, the boundary identifier 420 can detect an NDVI value of 0 (corresponding to a non-vegetated area, e.g., bare land or road) an NDVI value of 0.5 (corresponding to soybean), and an NDVI value of 0.8 (corresponding to corn). Thus, each NDVI value can be representative of a different parcel. The boundary identifier 420 can identify and/or validate boundary delineations based on the different NDVI values detected. For example, the boundary identifier 420 can identify pixels having an NDVI value of 0 to 0.0 (e.g., no vegetation) as non-vegetated areas, and the boundary identifier 420 can identify pixels having an NDVI value of 0.0 to 1.0 (e.g., vegetation) as vegetated areas. The non-vegetated areas (e.g., a road network) can be used to separate parcels. The boundary identifier 420 delineates (e.g., separates) parcels having different NDVI values and generates boundary lines in the boundary delineation map. When two or more adjacent vegetated areas include uniform NDVI values (e.g., the same or substantially the same value, a contiguous/uniform signal, etc.), the boundary identifier 420 can identify the two or more adjacent vegetated areas as a single parcel under common ownership, and the boundary identifier 420 can generate boundary lines around the two or more adjacent parcels (e.g., pixels) in the boundary delineation map.

Similarly, management practices of parcels can be used to further define boundary delineations. Management practices can include, for example, planting different crop types at different times of the year, tilling and/or irrigation practices, planting configurations, etc. In some embodiments, the management practices can be included in the satellite data 406 and/or historical data 408 (e.g., previous NDVI values). Satellite image data 406 and/or historical data 408 can be extracted from each parcel at predetermined intervals over a period of time (e.g., every month for a period of ten years). The data 406, 408 can be stored in memory, such as memory 410, and can be used as historical planting patterns. Parcels that exhibit similar management practices (e.g., frequency of planting the same crop type, tilling, etc.) over a period of time (e.g., ten years) is indicative of parcels belonging to the same landowner. Thus, similar management practices can establish historical planting patterns, which is indicative of land under the same ownership.

For example, each satellite image of a target geographic area is associated with a respective timestamp (e.g., calendar day-of-year, time-of-day, etc.). If adjacent parcels exhibit similar management practices (e.g., tilling, direction of planting rows, etc.) at the same timestamp over a predetermined period of time, which can be included in input data 406, 408, the boundary identifier 420 can determine that such parcels are under common ownership.

In some embodiments, the management system 402 includes a vegetation identifier 422. The vegetation identifier 422 employs image recognition methods (e.g., image comparison techniques) and/or NDVI values to determine crop types within each of the parcels. The crop type(s) for each parcel can be determined at predetermined intervals (e.g., every month), and can be stored in memory 410 as historical planting patterns. For example, vegetation identifier 422 can determine that a particular parcel, defined by one or more boundary delineations, is planted with soybean and corn, in an alternating cycle (e.g., year 1=soybean, year 2=corn, year 3=soybean, year 4=corn, etc.). The alternating cycle can be stored in memory 410 and/or be employed as historical data 408 as a planting pattern specific to that particular parcel. In some embodiments, the vegetation identifier 422 can determine a frequency of a particular crop type and/or planting pattern within the respective parcel using historical data 408. The vegetation identifier 422 can predict a probability that a particular crop type will be planted within such boundary delineation for any given year based on the historical planting patterns associated with that particular parcel of land. In some embodiments, the vegetation identifier 422 uses historical data 408 to determine a probability that a particular crop type will be planted. The probability may be determined prior to the planting season.

The management plan generator 424 generates one or more farm management plans for each parcel based on the boundary delineation map, which may be given as output 428. In some embodiments, the farm management plan includes updated boundary delineations and/or maps to reconstruct/reconfigure land ownership data. In some embodiments, the farm management plan includes management practices (e.g., tillage, crop planting, harvesting, etc.) conducted in similarly located areas during a particular time of the year, such that a landowner/user can similarly manage his/her property. In an embodiment, the farm management plan includes a probability that a certain crop type should be planted, taking in account data 406, 408 (e.g., historical production costs, historical prices for crop types, historical demand for crop types, etc.).

In some embodiments, the yield estimator 426 can estimate a total planted area of a particular crop type (e.g., corn) and/or agricultural yield of a particular crop type. The estimated yield can be based on, for example, NDVI values, historical yield data, and/or amount of acreage within the one or more parcels. In some embodiments, the estimated yield value(s) can be given as output 428. For example, the yield estimator 426 can compare NDVI values within the satellite image(s) to determine the total planted area and/or agricultural yield of a particular crop. All pixels having same/similar NDVI values may be indicative of such parcels having the same crop type. The total yield of a particular crop type can be determined my multiplying the number of pixels having the same/similar NDVI values and pixel resolution information (e.g., including acreage of such pixels). For example, pixel resolution information may include acreage information, such as the amount of acreage within a given pixel.

More than thirty years of historical data of yield estimates exists for different geographies, which can be based on pixel resolution. NDVI values can be calculated for the regions knowing what was planted and where. A linear relation can be established that would provide a first indicator of the yield before harvesting just by knowing the NDVI value measured in the satellite images. In addition, other spectral indices from the satellite images can be used to extract potential yield, such as thermal bands that indicate soil temperature, spectral indices (e.g., near infrared) sensitive to the total amount of moisture in the soil, etc. These parameters play a role in the final yield. Multiple parameters can be combined to create a multi regression where yield is dependent on NDVI, soil temperature and near infrared radiation. Furthermore, weather plays a significant role in determining the yield, since draught or excessive rain can reduce the yield. Historically, weather can be correlated for years when the yield was low to current weather patterns to determine similarities that would indicate the potential yield that can be obtained for a certain region. In addition, satellite data can indicate if all farms that have been planted with a crop are maintained or if they are abandoned during the season. Other indicators of high potential yield include, for example, the number of machinery that is operated in the field, number of invoices to rent harvesting equipment between farmers and machine shops, the amount of fertilizer that is used on the field, etc.

Figure 5:
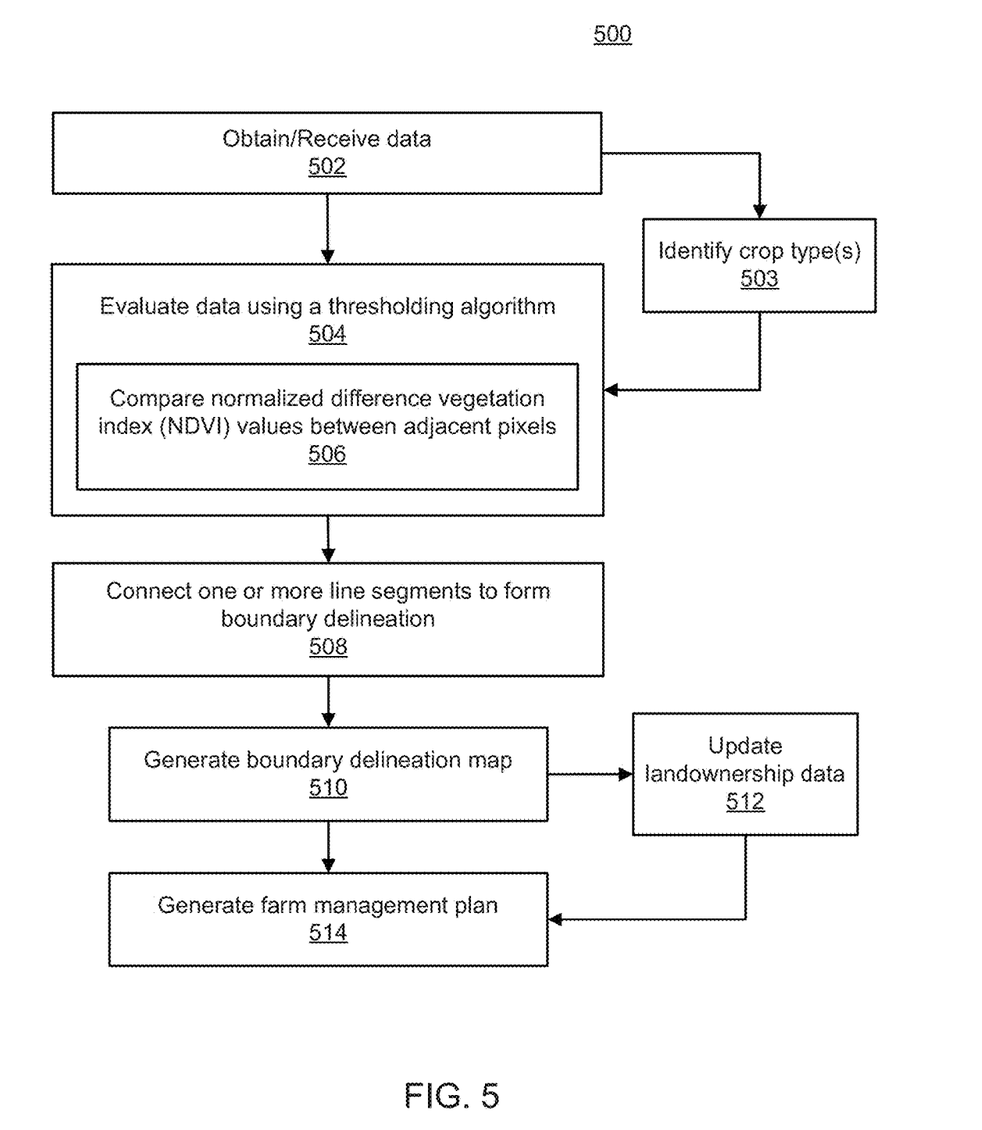
FIG. 5 is a block/flow diagram showing a system/method for determining boundary delineations in accordance with an embodiment of the present invention.

Referring to FIG. 5, an exemplary method 500 for determining boundary delineations within a target geographic area, in accordance with an embodiment of the present invention, is described. Part or all of method 500 can be performed by system 100 of FIG. 1 and system 400 of FIG. 4.

In block 502, information associated with a target area (e.g., geographic area of land), such as a farmland, is obtained. The information can include satellite data and/or historical data corresponding to the specific area of land (e.g., geographic area) being analyzed, such as satellite data 406 and/or historical data 408 shown in FIG. 4. For example, satellite data includes pixel information from one or more satellite images. Other information that can be obtained includes historical planting patterns, including crop types and associated planting schedules (e.g., times of the year that such crops may be planted), crop rotation patterns (e.g., rotation of specific crop types, such as corn and soy), production costs (e.g., fertilizer, seeds, etc.), historical supply/demand information for particular crop types, availability of resources (e.g., seeds available on the market), etc. In addition, historical data can include crop identifications and/or NDVI values for particular parcels of land over a predetermined period of time (e.g., ten years). In some embodiments, crop types can be identified using image recognition methods (e.g., image comparison techniques) and/or NDVI values, as shown in block 503.

In block 504, the data is evaluated using a thresholding algorithm to generate one or more line segments between adjacent pixels. The one or more line segments are a portion of a boundary delineation. For example, the satellite pixels can be analyzed for same characteristics, such as similarity of NDVI, thermal or near-infrared values. Categories for these pixels can be defined based on large scale analysis of land, where different identified crops are quantified based on mean values, standard deviation, and variances. Once a category with a well-defined value is defined, the pixel value from the satellite image may be associated with that crop (e.g., crop recognition). Pixels in close proximity can be clustered based on similar characteristics, until a larger contiguous area is defined.

In some embodiments, evaluating the data includes comparing normalized difference vegetation index (NDVI) values between adjacent pixels, as shown in block 506. For example, adjacent pixels having substantially similar NDVI values can be grouped into a same parcel and are indicative of a parcel of land having a same crop type. In an embodiment, adjacent pixels having different NDVI values can be separated by a line segment and are indicative of different parcels of land having different crop types. Accordingly, distinct changes in the NDVI values between two parcels is indicative of a boundary delineation.

In some embodiments, evaluating the data includes comparing management practices, such as crop rotation patterns, between pixels. For example, adjacent pixels having similar crop rotation patterns can be grouped into a same parcel and are indicative of a parcel of land having common ownership. In an embodiment, adjacent pixels having different crop rotation patterns can be separated by a line segment and are indicative of different parcels of land. Accordingly, distinct changes and/or similarities in management practices between two parcels is indicative of a boundary delineation.

In block 508, the method 500 includes connecting the one or more line segments to an adjacent line segment to form a boundary delineation defining at least one land parcel within the target area. The at least one land parcel can be represented as a closed loop and/or closed polygon that approximately resembles a rectangle, square, triangle, etc. A boundary delineation map can be generated including the boundary delineation in block 510.

In block 512, the method 500 includes updating landowner ship data using the boundary delineation map. For example, previous landownership information, including boundary delineations and/or property lines, can be updated with the boundary delineation map generated in block 510. If the boundary delineations in the boundary delineation map are larger than farm boundaries (as extracted from previous identified boundary contours and stored in a database), the previous farm boundaries are cropped to shapes that reflect typical values in that area, as represented in the boundary delineation map. These cropped shapes may be representative of the updated landownership values and define new farm boundary contours that can be used to update existing databases.

In block 514, a farm management plan can be generated for each parcel. The farm management plan includes updated boundary delineations and/or maps to reconstruct/reconfigure land ownership data. In some embodiments, the management plan includes management practices (e.g., tillage, crop planting, harvesting, etc.) conducted in similarly located areas during a particular time of the year, such that a landowner/user can similarly manage his/her property. In an embodiment, the management plan includes a probability that a certain crop type should be planted, taking in account historical data (e.g., crop rotational patterns, historical planting patterns, historical production costs, historical prices for crop types, historical demand for crop types, etc.). For example, new recommendations can be made regarding management practices (e.g., application of fertilizer, planting of a particular crop types, etc.) based on a deviation of the NDVI values compared with a mean value extracted from farms in close proximity. In some embodiments, generating the management plan includes estimating agricultural yield based on, for example, NDVI values, historical yield data and/or amount of planted acreage within the one or more parcels.

Farm boundary delineation and crop determination in accordance with an embodiment of the present invention offers several advantages. For example, land ownership databases can be updated to reflect more accurate boundary delineations, which are especially important for areas that are not publically available. Further, yield production can be estimated based on a total amount of planted crops and/or planted acreage so that the crop yields for the entire farm may be maximized.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
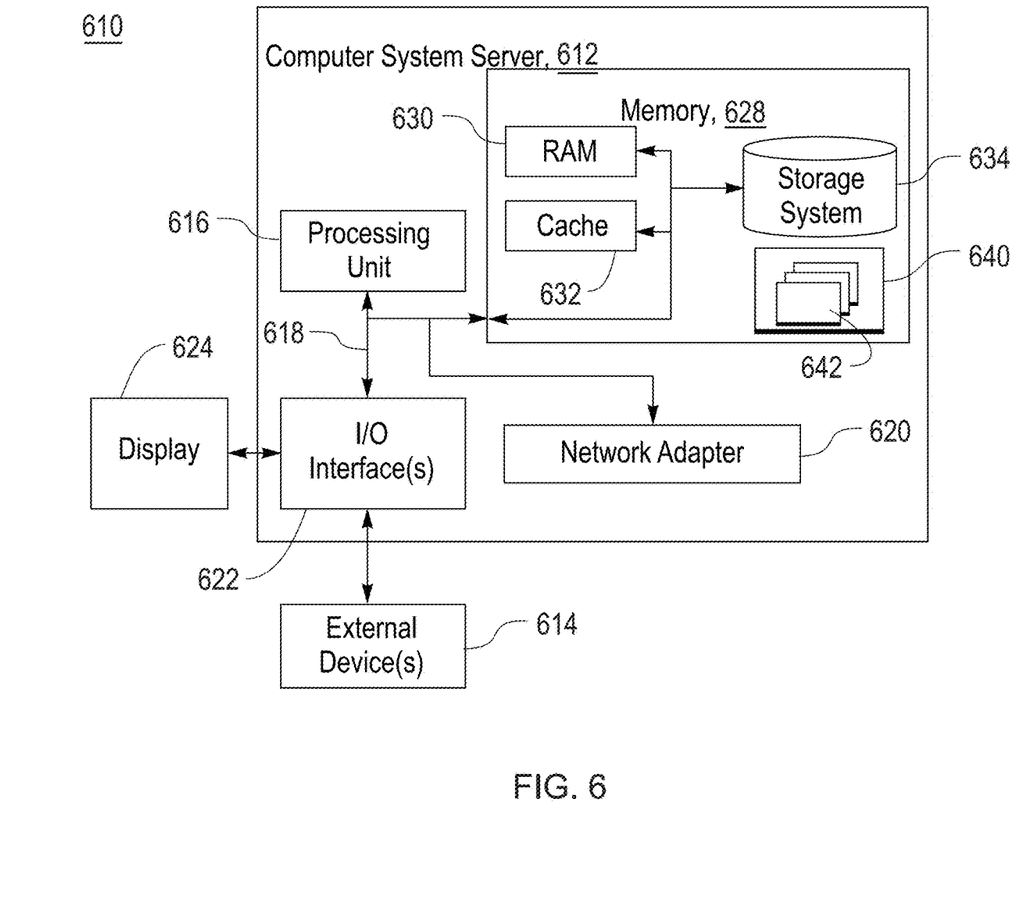
FIG. 6 shows an exemplary cloud computing node in accordance with an embodiment of the present invention.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples include, but are not limited to: microcode, device drivers, redundant processing units, external disk drive arrays, RAID systems, tape drives, and data archival storage systems, etc.

Figure 7:
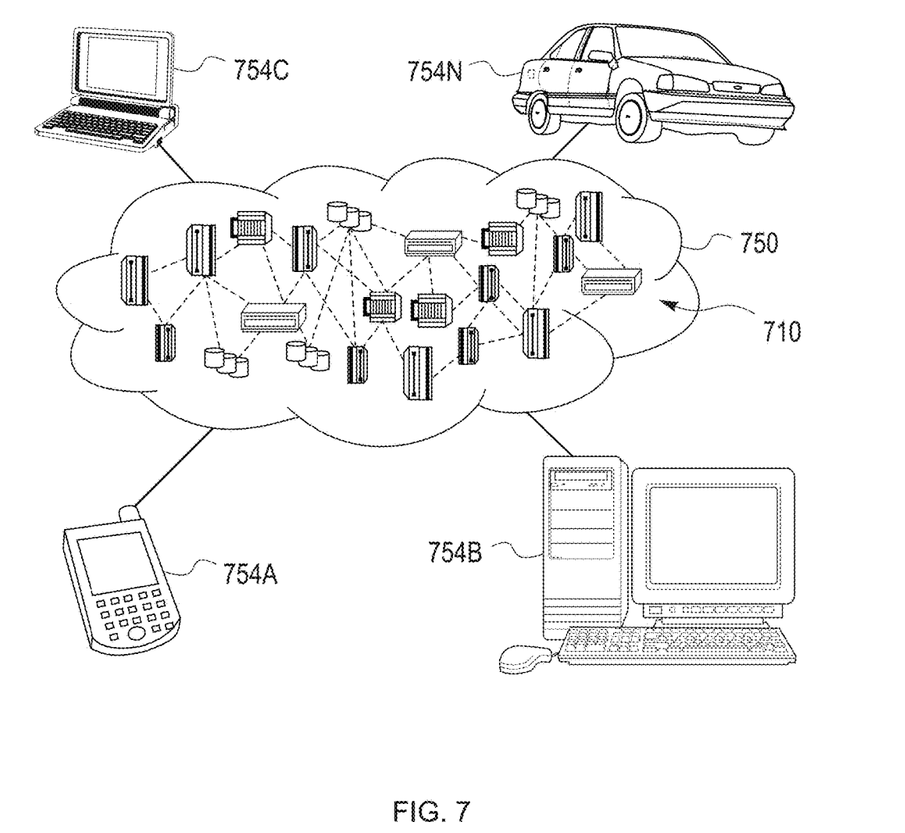
FIG. 7 shows an exemplary cloud computing environment in accordance with an embodiment of the present invention.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
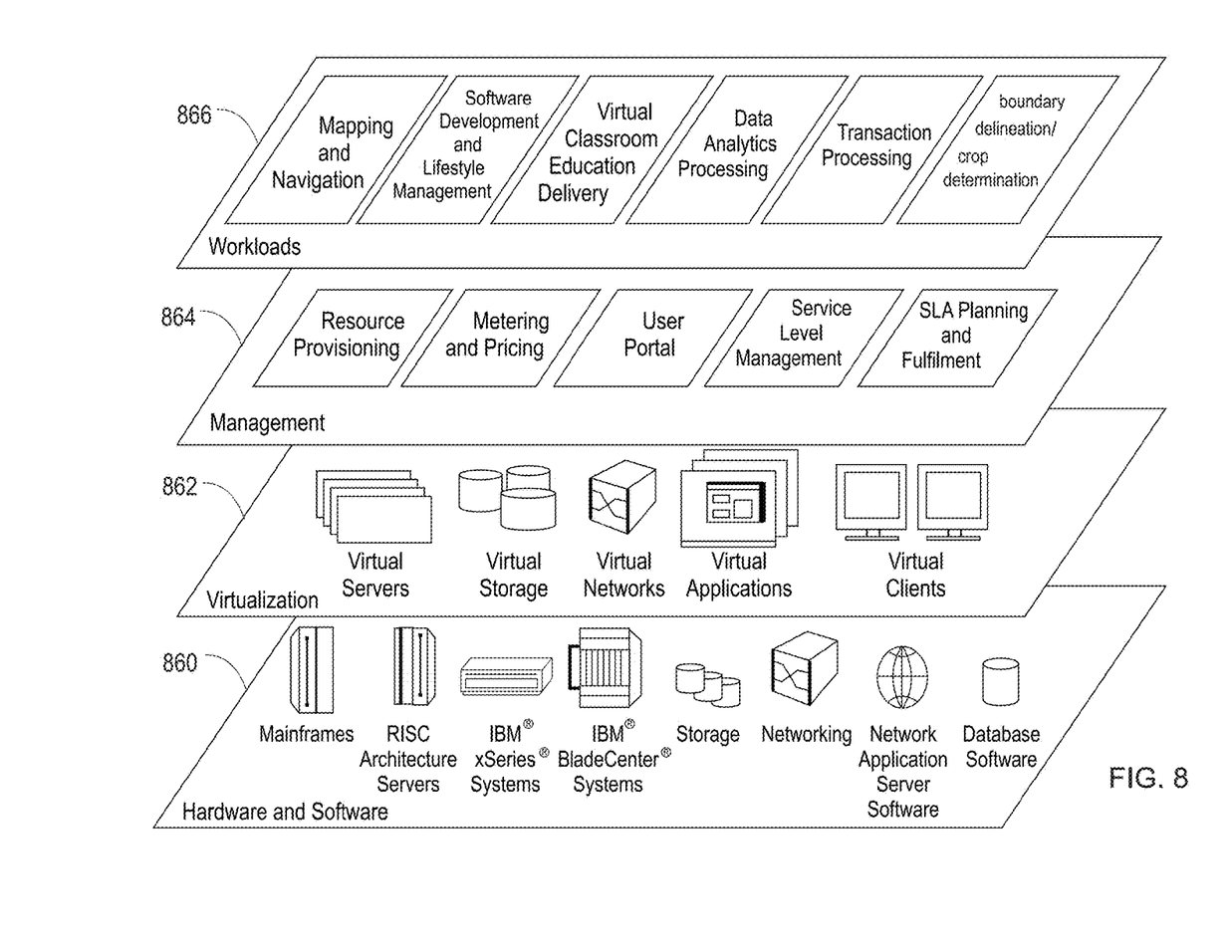
FIG. 8 shows exemplary abstraction model layers, in accordance with an embodiment of the present invention.

FIG. 8 shows a set of functional abstraction layers provided by cloud computing environment 750. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and boundary delineation and crop determination.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for determining boundary delineations (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for improving farm management by determining farm boundary delineations within a target geographic area based on crop recognition, comprising:
    extracting data from pixels of at least one satellite image of the target geographic area, the data including at least a type of vegetation present at a location represented by each pixel;
    evaluating the data using a classification algorithm to generate one or more line segments at an interface separating each pixel in at least one pair of adjacent pixels, the one or more line segments being representative of a portion of a boundary delineation;
    connecting the one or more line segments to an adjacent line segment to form a boundary delineation defining at least one parcel of land within the target geographic area;
    generating a boundary delineation map including the boundary delineation; and
    generating a farm management plan including the boundary delineation map and a recommended crop type, the farm management plan being generated based on at least the type of vegetation present at the at least one parcel of land.

2. The method of claim 1, wherein the data includes a plurality of remote sensing measurements detected from the target geographic area.

3. The method of claim 2, wherein the plurality of remote sensing measurements includes normalized difference vegetation index (NDVI) values.

4. The method of claim 3, wherein evaluating the data includes comparing NDVI values of at least two adjacent pixels.

5. The method of claim 4, further comprising grouping the at least two adjacent pixels in a same parcel when the NDVI values of the at least two adjacent pixels are substantially similar.

6. The method of claim 4, further comprising separating the at least two adjacent pixels by a line segment when the NDVI values of the at least two adjacent pixels are substantially different.

7. The method of claim 4, further comprising updating land ownership databases with the boundary delineation map.

8. The method of claim 1, wherein extracting the data includes extracting historical data from a plurality of satellite images over a predetermined timespan, the historical data being selected from the group consisting of historical planting patterns, crop rotation patterns, management practices, and a series of NDVI values for each pixel in the plurality of satellite images during the predetermined timespan.

9. The method of claim 8, wherein evaluating the data includes:
    comparing the crop rotation patterns of at least two adjacent pixels; and
    grouping the at least two adjacent pixels in a same parcel when the crop rotation patterns of the at least two adjacent pixels are the same.

10. The method of claim 8, further comprising estimating a probability of a crop type being planted based on the crop rotation patterns.

11. A system for improving farm management by determining farm boundary delineations within a target geographic area based on crop recognition, comprising:
   memory storing computer code and data;
   one or more inputs through which data for the target geographic area is received by the system, wherein the data is extracted from pixels of at least one satellite image of the target geographic area, the data including at least a type of vegetation present at a location represented by each pixel; and
   one or more processors coupled to memory, the one or more processors executing computer code instructing the one or more processors to operate as:
      an analyzer to evaluate the data using a classification algorithm to generate one or more line segments at an interface separating each pixel in at least one pair of adjacent pixels, the one or more line segments being representative of a portion of a boundary delineation; and
      a boundary identifier to connect the one or more line segments to an adjacent line segment to form a boundary delineation defining at least one parcel of land within the target geographic area, and generate a boundary delineation map including the boundary delineation; and
      a farm management plan generator to generate a farm management plan including the boundary delineation map and a recommended crop type, the farm management plan being generated based on at least the type of vegetation present at the at least one parcel of land.

12. The system of claim 11, wherein the data includes normalized difference vegetation index (NDVI) values detected from the target geographic area.

13. The system of claim 12, wherein the analyzer evaluates the data by comparing NDVI values of at least two adjacent pixels.

14. The system of claim 13, wherein the boundary identifier groups the at least two adjacent pixels in a same parcel when the NDVI values of the at least two adjacent pixels are substantially similar.

15. The system of claim 13, wherein the boundary identifier separates the at least two adjacent pixels by a line segment when the NDVI values of the at least two adjacent pixels are substantially different.

16. A computer program product for improving farm management by determining farm boundary delineations within a target geographic area based on crop recognition, the computer program product comprising a non-transitory computer readable storage medium having program instructions embodied therewith, the program instructions being executable by a computer to cause the computer to perform a method comprising:
   extracting data from pixels of at least one satellite image of the target geographic area, the data including at least a type of vegetation present at a location represented by each pixel;
   evaluating the data using a classification algorithm to generate one or more line segments at an interface separating each pixel in at least one pair of adjacent pixels, the one or more line segments being representative of a portion of a boundary delineation;
   connecting the one or more line segments to an adjacent line segment to form a boundary delineation defining at least one parcel of land within the target geographic area;
   generating a boundary delineation map including the boundary delineation; and
   generating a farm management plan including the boundary delineation map and a recommended crop type, the farm management plan being generated based on at least the type of vegetation present at the at least one parcel of land.

17. The computer program product of claim 16, wherein the data includes normalized difference vegetation index (NDVI) values detected from the target geographic area.

18. The computer program product of claim 17, wherein evaluating the data includes comparing NDVI values of at least two adjacent pixels.

19. The computer program product of claim 18, further comprising grouping the at least two adjacent pixels in a same parcel when the NDVI values of the at least two adjacent pixels are substantially similar.

20. The computer program product of claim 16, further comprising separating the at least two adjacent pixels by a line segment when the NDVI values of the at least two adjacent pixels are substantially different.

* * * * *